United States Patent
Han et al.

(10) Patent No.: US 8,483,037 B2
(45) Date of Patent: *Jul. 9, 2013

(54) METHOD OF SEARCHING CODE SEQUENCE IN MOBILE COMMUNICATION SYSTEM

(75) Inventors: Seung Hee Han, Seoul (KR); Min Seok Noh, Seoul (KR); Yeong Hyeon Kwon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/370,208

(22) Filed: Feb. 9, 2012

(65) Prior Publication Data

US 2012/0140837 A1    Jun. 7, 2012

Related U.S. Application Data

(63) Continuation of application No. 12/280,540, filed as application No. PCT/KR2007/000973 on Feb. 26, 2007.

(30) Foreign Application Priority Data

Feb. 24, 2006 (KR) .................. 10-2006-0018103
Apr. 6, 2006 (KR) .................. 10-2006-0031534

(51) Int. Cl.
*H04J 11/00* (2006.01)
*H04B 7/216* (2006.01)

(52) U.S. Cl.
USPC .................. 370/202; 370/210; 370/335

(58) Field of Classification Search
USPC ........... 370/202, 204, 208, 210, 335; 455/434
See application file for complete search history.

(56) References Cited

U.S. PATENT DOCUMENTS

| 4,701,905 A | 10/1987 | Un et al. |
| 4,797,925 A | 1/1989 | Lin |
| 6,646,979 B1 * | 11/2003 | Chen et al. .................. 370/208 |

(Continued)

FOREIGN PATENT DOCUMENTS

| KR | 1020060044126 | 5/2006 |
| KR | 1020060066028 | 6/2006 |
| WO | 0150634 | 7/2001 |
| WO | 2006015108 | 2/2006 |

OTHER PUBLICATIONS

Jason Hou et al., "Preamble Sequence for Fast Cell Search, Low Computational Complexity, and Low PAPR", IEEE 802.16 Broadband Wireless Access Working Group, IEEE C802.16e-04/265r1, Aug. 2004.

(Continued)

*Primary Examiner* — Farah Faroul
(74) *Attorney, Agent, or Firm* — Lee, Hong, Degerman, Kang & Waimey

(57) ABSTRACT

A method for transmitting a signal for cell searching in a mobile communication system having a multi-cell environment includes transmitting the signal to one or more receiving party devices within a cell, wherein the signal is used for a synchronization of the one or more receiving party devices within the cell, the signal is defined by a combination of a first code sequence derived from a first index and a second code sequence derived from a second index, and an identity of the cell is used for defining the combination of the first code sequence and the second code sequence.

4 Claims, 13 Drawing Sheets

U.S. PATENT DOCUMENTS

| | | | |
|---|---|---|---|
| 6,687,501 B2 * | 2/2004 | Soliman | 455/424 |
| 6,888,880 B2 * | 5/2005 | Lee et al. | 375/149 |
| 6,920,123 B1 * | 7/2005 | Shin et al. | 370/335 |
| 6,937,641 B2 * | 8/2005 | Li et al. | 375/141 |
| 7,130,642 B2 | 10/2006 | Lin | |
| 7,379,446 B2 | 5/2008 | Laroia et al. | |
| 7,552,257 B2 * | 6/2009 | Becker et al. | 710/100 |
| 7,586,836 B2 * | 9/2009 | Park et al. | 370/209 |
| 7,599,335 B2 * | 10/2009 | Zalio et al. | 370/335 |
| 8,027,244 B2 | 9/2011 | Kishiyama et al. | |
| 2001/0048713 A1 | 12/2001 | Medlock et al. | |
| 2002/0091318 A1 | 7/2002 | Chiao et al. | |
| 2003/0135332 A1 | 7/2003 | Shackleford et al. | |
| 2005/0265293 A1 * | 12/2005 | Ro et al. | 370/335 |
| 2006/0003767 A1 | 1/2006 | Kim et al. | |
| 2006/0023773 A1 | 2/2006 | Nakayama | |
| 2006/0028976 A1 * | 2/2006 | Park et al. | 370/203 |
| 2006/0050799 A1 | 3/2006 | Hou et al. | |
| 2007/0026792 A1 | 2/2007 | Korneluk et al. | |
| 2007/0177682 A1 | 8/2007 | Han et al. | |
| 2007/0266245 A1 * | 11/2007 | Sestili | 713/168 |
| 2008/0089282 A1 | 4/2008 | Malladi et al. | |
| 2009/0238137 A1 | 9/2009 | Kishiyama et al. | |
| 2010/0220695 A1 | 9/2010 | Han et al. | |
| 2013/0064231 A1 * | 3/2013 | Chang et al. | 370/336 |

OTHER PUBLICATIONS

United States Patent and Trademark Office U.S. Appl. No. 12/280,540, Office Action dated Jan. 31, 2013, 7 pages.

* cited by examiner

METHOD OF SEARCHING CODE SEQUENCE IN MOBILE COMMUNICATION SYSTEM

CROSS-REFERENCE TO RELATED APPLICATIONS

This application is a continuation of U.S. patent application Ser. No. 12/280,540, filed on Jan. 6, 2009, currently pending, which is the National Stage filing under 35 U.S.C. 371 of International Application No. PCT/KR2007/000973, filed on Feb. 26, 2007, which claims the benefit of earlier filing date and right of priority to Korean Application Nos. 10-2006-0031534, filed on Apr. 6, 2006, and 10-2006-0018103, filed on Feb. 24, 2006, the contents of which are all incorporated by reference herein in their entirety.

TECHNICAL FIELD

The present invention relates to a mobile communication system, and more particularly, to a method of searching a code sequence in a cell based mobile communication system, by which a receiving side is able to efficiently search code sequences.

BACKGROUND ART

Generally, in a mobile communication system, a mobile station uses a preamble which is broadcasted and used for searching for a cell to which the mobile station itself belongs. In order to effectively search cells using the preamble, various codes are used, which can be implemented by putting a limitation on a frequency or a spreading code, or the like that is to be used.

In the above methods, a cell search performance depends on a sequence itself. As an example of a sequence having a good autocorrelation characteristic and peak to average power ratio (hereinafter abbreviated PAPR), there is CAZAC (constant modulus and zero autocorrelation) sequence. A mobile station is able to effectively search a cell using the CAZAC sequence. However, in an environment where other neighbor cells are simultaneously detected like a cell boundary area, the mobile station is unable to search a neighbor cell with simple algorithm but has to perform a full search by calculating correlation for a sequence corresponding to the entire cells.

FIG. 1 is a diagram of a cell search process according to a related art. Referring to FIG. 1, a cell transmits a preamble 11 to enable mobile stations to discriminate cells before transmitting data or control information. In case that a mobile station attempts to communicate with the cell, it receives the preamble 11 transmitted from the cell and then carries out channel estimation using the received preamble 11.

In order to discriminate cells by receiving a preamble, the mobile station is provided with a code set consisting of codes respectively corresponding to the cells and performs a cell search using signals transferred by a correlator 13 and correlation values. In the above cell search method, cell search algorithm should be simple to effectively perform the cell search.

FIG. 2 is a structural diagram of a frame applied to a communication system. First of all, assuming that a preamble code set transmittable by a cell is named $C_p$ and that a preamble code assigned to a $j^{th}$ cell is named $C_j$, the cell transmits the preamble code before broadcasting control information or data and then additionally transmits information for enabling precise channel estimation or synchronization.

A receiving side obtains signals of a received preamble part and then checks a correlation value with a preamble set provided to the receiving side. Equation 1 related to a correlation value checking method.

$$J_k(\tau) = \sum_{\tau=0}^{N-1} c_k^{n*} c_j^{n-\tau} \qquad \text{[Equation 1]}$$

In Equation 1, $C_k$ indicates an arbitrary code existing in a code set, N indicates a code length, and $\tau$ indicates a delay component of autocorrelation. In this case, a cost $JM_k(\tau)$ or $C_k$ can be expressed as Equation 2.

$$JM_k = \max_{\tau=0,\ldots,N-1} J_k(\tau) \qquad \text{[Equation 2]}$$

If the cost is calculated for each code constructing the code set and if a code having a maximum value among the calculated costs is selected, it is able to search a cell corresponding to the selected code. A cell search method using the cell cost is represented as Equation 3.

$$K^* = \arg\max_{k=0,\ldots,N-1} JM_k \qquad \text{[Equation 3]}$$

In case that a code itself fails to have any configuration, all the codes configuring the code set should be searched. Yet, in case that a code itself has a specific pattern, it is able to efficiently search a cell using it. For instance, in case that CAZAC sequence is used as a preamble code, it is able to use a linear frequency increase characteristic of the CAZAC sequence. The frequency increase characteristic shows a single frequency component if a progression of differences of a phase is calculated, if the calculated progression of differences is converted to an exponential function value, and if discrete Fourier transform (hereinafter abbreviated DFT) is performed on the exponential function value. Yet, a result of the DFT in the characteristics of the CAZAC sequence is totally changed according to the influence made by a different CAZAC sequence coming from another cell in the vicinity of a cell boundary. Accordingly, in case of using such a sequence as CAZAC, it is able to obtain a transmitted preamble code through simple algorithm if a peripheral interference signal does not exist. If an interference signal however exists, the characteristics of the CAZAC sequence are ruined. Accordingly, it is difficult to detect the preamble through simple algorithm.

In particular, in case that a mobile station searches all possible code combinations, it is unable to efficiently search a code sequence. In case of such a sequence having a specific characteristic as a CAZAC sequence, if interference signals considerably exist around a cell boundary, it is unable to search a code sequence using simple algorithm.

DISCLOSURE OF THE INVENTION

Accordingly, the present invention is directed to a method of searching a code sequence in mobile communication system that substantially obviates one or more of the problems due to limitations and disadvantages of the related art.

An object of the present invention is to provide a method of enabling a receiving side to efficiently search a code sequence.

Another object of the present invention is to provide a method of enabling fast initial acquisition by reducing complexity of a receiving side for a code sequence search and by reducing a cell search time.

Another object of the present invention is to provide a method of reducing a cell search error.

Another object of the present invention is to provide a method of expanding code sequence types available for a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting a code sequence for an efficient code sequence search in a mobile communication system comprises boosting at least one tone for a code sequence, and transmitting the code sequence having the boosted at least one tone to a receiving side.

Preferably, the at least one tone boosting step comprises increasing an amplitude of a code element corresponding to the at least one tone in the code sequence, and modulating the code sequence through a plurality of sub-carriers.

Preferably, the amplitude of the code element is increased in a manner of boosting the at least one tone while an overall power allocated to the code sequence is uniformly maintained.

Preferably, a specific one of the at least one tone establishes a prescribed relation with code identification information for identifying the code sequence in a code sequence set including the code sequence.

As another aspect of the present invention, a method of receiving a code sequence for an efficient code sequence search in a mobile communication system comprises receiving signals for a code sequence having at least two tones boosted by a transmitting side, and obtaining prescribed information from at least one of identification information for the code sequence and a combination of identification information for the boosted at least two tones of the code sequence.

As further another aspect of the present invention, a method of receiving a code sequence for an efficient code sequence search in a mobile communication system comprises receiving signals for a code sequence having at least two tones boosted by a transmitting side and obtaining prescribed information previously agreed between the transmitting side and a receiving side from at least one of identification information for the code sequence and a combination of identification information for the boosted at least two tones of the code sequence.

As further another aspect of the present invention, a method of signal processing for an efficient code sequence search in a mobile communication system comprises increasing an amplitude of a code element of a code sequence for cell search and modulating the code sequence through a plurality of sub-carriers. Preferably, amplitudes of other code elements except the code element are adjusted to uniformly maintain a total power allocated to the code sequence.

As further another aspect of the present invention, a method of transmitting a code sequence for cell search in a cell based mobile communication system comprises transmitting a first code sequence for identifying a cell group including at least one cell to a receiving side and transmitting a second code sequence for identifying a specific cell included in the cell group identified by the first code sequence to the receiving side, wherein a specific tone of at least one of the first and second code sequences is boosted to be transmitted.

As further another aspect of the present invention, a method of cell search in a cell based mobile communication system comprises receiving signals for a code sequence of which a tone is boosted, the signals transmitted from a transmitting side, obtaining code identification information for identifying the code sequence from element identification information for identifying a code element corresponding to the boosted tone, and identifying a cell using the code identification information.

As further aspect of the present invention, a method of cell search in a cell based mobile communication system comprises receiving signals for a code sequence having a tone boosted by a transmitting side, obtaining a cell group identifier for identifying a cell group including at least one cell from element identification information for identifying a code element corresponding to the boosted tone, and identifying a cell included within the cell group using the code sequence.

As further aspect of the present invention, a method of cell search in a cell based mobile communication system comprises obtaining a cell group identifier for identifying a cell group including at least one cell using a first code sequence transmitted from a transmitting side and obtaining a cell identifier for identifying a cell included in the cell group identified by the cell group identifier using a second code sequence transmitted from the transmitting side, wherein the transmitting side boosts a specific tone of at least one of the first and second sequences.

As further aspect of the present invention, a transmitter for a mobile communication system comprises means for adjusting an amplitude of a code element for boosting a specific tone in a specific code sequence and means for converting the code sequence into time domain signals.

As further aspect of the present invention, a method of transmitting signals for cell search in a cell based mobile communication system comprises configuring a preamble by combining at least one code sequence selected from a first code set and at least one code sequence selected from a second code set together, the preamble transmitted ahead of transmission of control signals and data signals and transmitting the configured preamble.

As further aspect of the present invention, a method of cell search in a cell based mobile communication system comprises receiving a preamble including a combination of code sequences selected from at least two code sets, respectively and performing cell search by using characteristics of the code sequences configuring the combination.

BEST MODE FOR CARRYING OUT THE INVENTION

Reference will now be made in detail to the preferred embodiments of the present invention, examples of which are illustrated in the accompanying drawings. The following embodiments are examples for applying technical idea of the present invention to an OFDM (orthogonal frequency division multiplexing) system.

For the explanation of the basic concept of the present invention, it is assumed that direct current (DC) and guard carrier, cyclic prefix (CP), and channel noise environments are not taken into consideration. For facilitation of explanation, one resource is assumed as one OFDM symbol in an OFDM system. Further, it is assumed that a sequence is inserted on a frequency domain. Zadoff-Chu CAZAC sequence is exemplarily taken as a sequence to use for explanation. Alternatively, a different sequence type having a good correlation characteristic may also be used.

Figure 1:
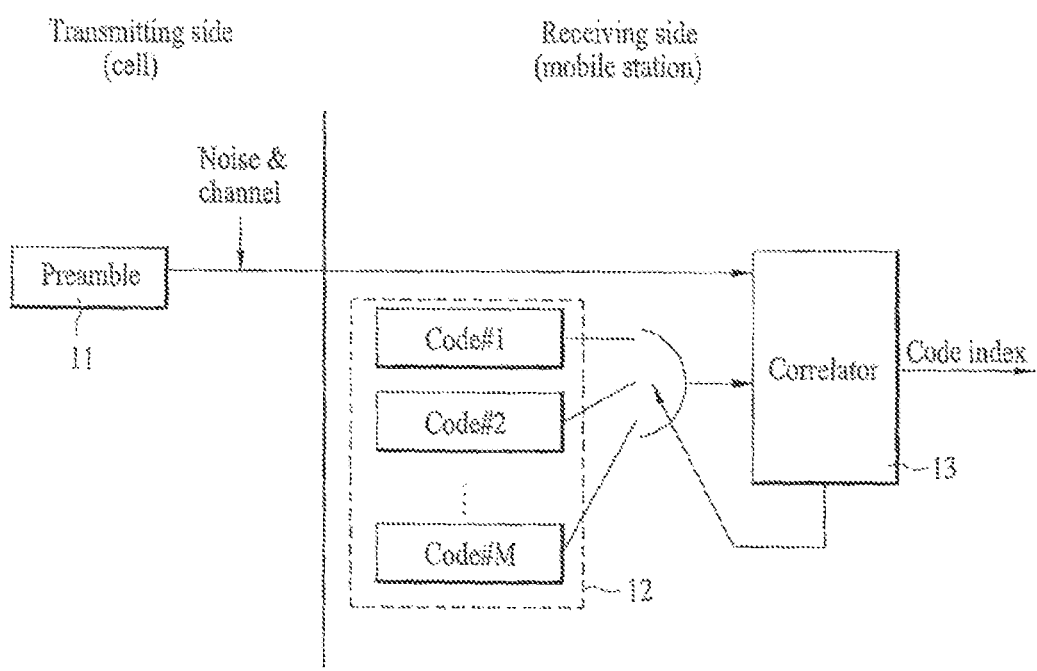
FIG. 1 is a diagram of a cell search process according to a related art.
Figure 2:
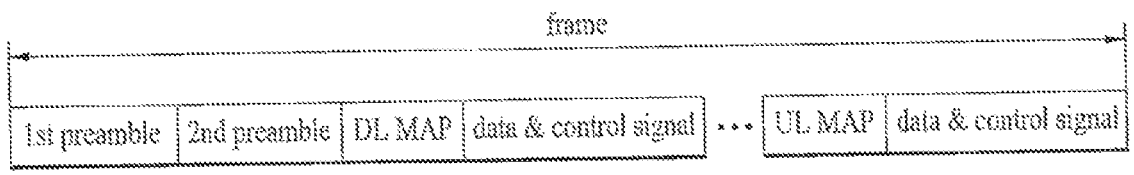
FIG. 2 is a configurational diagram of a frame structure applied to a communication system according to a related art.
Figure 3:
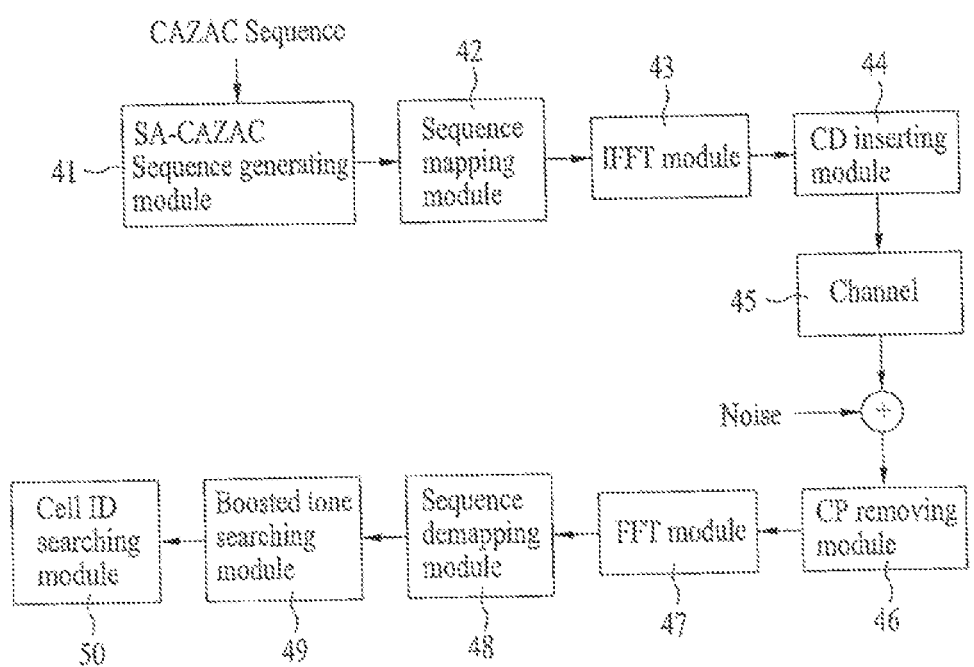
FIG. 3 is a block diagram according to one preferred embodiment of the present invention.

FIG. 3 is a block diagram according to one preferred embodiment of the present invention.

Referring to FIG. 3, a SA-CAZAC sequence generating module 41 generates a SA-CAZAC sequence by performing data processing of an embodiment the present invention on a specific CAZAC sequence. A sequence mapping module 42 maps the SA-CAZAC sequence outputted from the SA-CAZAC sequence generating module 41 to a sub-carrier on a frequency domain. An IFFT module 43 transforms frequency domain signals into time domain signals through IFFT operation. A CP inserting module 44 inserts a guard interval (CP: cyclic prefix). A code sequence transmitted to a receiving side via a channel is mixed with a noise in the course of transmission and is then received by the receiving side. A CP removing module 46 removes the CP from the signals received by the receiving side. The corresponding signals are transformed into frequency domain signals from time domain signals by a FFT module 47. Sequence de-mapping is then carried out on the transformed signals by a sequence de-mapping module 48. A boosted tone searching module 49 searches the de-mapped sequence for a boosted tone. A cell ID searching module 50 obtains a cell ID using the searched boosted tone. Examples for generating a SA-CAZAC sequence by the SA-CAZAC sequence generating module 41 and a cell search method by the boosted tone searching module 49 and the cell ID searching module 50 are explained in detail as follows.

A $k^{th}$ element of Zadoff-Chu CAZAC sequence for a code type index M having a length N is represented as Equation 4 if N is even or Equation 5 if N is odd. In generating different type sequences, there are various methods such as a method of performing circular shift on a CAZAC sequence by considering a maximum delay spread of a channel. For convenience of explanation, a case of generating different sequences by different M values is taken into consideration only.

$$C^M(k) = \exp\left(i\frac{M\pi k^2}{N}\right),$$
$$k = 0, 1, 2, \ldots, N-1$$
when $N$ is even
[Equation 4]

$$C^M(k) = \exp\left(i\frac{M\pi k(k+1)}{N}\right),$$
$$k = 0, 1, 2, \ldots, N-1$$
when $N$ is odd
[Equation 5]

In case of a boosted index l according to a code type M, a code index M is transformed in the boosted index l by Equation 6.

$$l = \text{index}(M) \quad \text{[Equation 6]}$$

In Equation 6, 'index( )' indicates an index transform function and l has one-to-one mapping relation to M values. As an example of the index transform function, any function capable of meeting the one-to-one correspondence such as a linear function, a random function, and the like is usable.

One embodiment of the present invention is characterized in boosting an $l^{th}$ tone for a code sequence. In this case, 'boosting an $l^{th}$ tone' means that a power allocated to an $l^{th}$ code element (hereinafter 'element') of the code sequence is set greater than that of another element. It is also possible for a receiving side to discriminate the $l^{th}$ element from other elements by shifting, in a transmitting side, a phase of the $l^{th}$ element to be different from those of other elements as well as by the method of boosting the $l^{th}$ tone of the code sequence.

Moreover, it may be considered that a power allocated to an element corresponding to another tone except the code sequence boosted $l^{th}$ tone is reduced lower than a predetermined level. Furthermore, it is possible to set a power allocated to an element corresponding to another tone except the $l^{th}$ tone to '0'. In other words, it is able to consider boosting the power allocated to the $l^{th}$ element for the code sequence without allocating powers to other elements.

As another embodiment, it is able to consider a method of boosting a tone corresponding to an element of '0' using a code sequence including one element of '1' and other elements of '0'. For instance, a code sequence {1, 0, 0, 0, 0, 0, 0, 0, 0, 0} having a length of 10 can be transmitted by boosting the first element. Equation 7 is provided to explain an example of a detailed method of boosting an $l^{th}$ tone. In the present disclosure, a specific tone boosted CAZAC sequence is defined as a single-tone added CAZAC sequence (SA-CAZAC sequence).

$$C_l^M(k) = \begin{cases} \frac{1}{\sqrt{\overline{P}}} \sqrt{\lambda} C^M(k), & \text{when } k = l \\ \frac{1}{\sqrt{\overline{P}}} C^M(k), & \text{otherwise} \end{cases} \quad \text{[Equation 7]}$$

In Equation 7, $C^M(k)$ is a general CAZAC sequence generated from Equation 4 and Equation 5, 'k' corresponds to k=0, 1, 2, ..., N−1, l=0, 1, ..., N−1, and 'M' is a natural number relatively prime to 'N' (e.g., M=1, 2, ..., N−1 if N is a prime number). λ is a positive real number as a boosting factor. And, $\overline{P}$ is expressed as Equation 8.

$$\overline{P} = \frac{1}{N}\left(\sum_{k \neq l} |C^M(k)|^2 + |\sqrt{\lambda} C^M(k)|^2\right) \quad \text{[Equation 8]}$$

In Equation 7, $C_l^M(k)$ indicates an $l^{th}$ tone boosted SA-CAZAC sequence and means that a power allocated to an $l^{th}$ element is boosted λ times by multiplying an amplitude of the $l^{th}$ element of an original CAZAC sequence prior to boosting the $l^{th}$ tone by $\sqrt{\lambda}$. In Equation 8, $\overline{P}$ is to sustain a power allocated to the whole CAZAC sequence at the same level. In particular, to boost the $l^{th}$ tone by sustaining the power allocated to the whole CAZAC sequence at the same level, powers allocated to other tones are reduced at a prescribed level.

Equation 7 and Equation 8 indicates that a procedure for boosting the $l^{th}$ tone is carried out before the CAZAC sequence symbol is converted to time domain signals i.e., prior to IFFT. According to another embodiment, it is possible to boost the $l^{th}$ tone after modulation by sub-carriers has been performed on the CAZAC sequence through IFFT.

In this case, a boosted index l is in a one-to-one mapping relation with a code type index M but does not need to have a same value according to each situation. For instance, if M=1, 2, ..., N−1, a boosted index for each code may correspond to l=1, 2, ..., N−1 or l=35, 2, 11, 50, .... For the purpose of randomization over several symbol durations, averaging, or the like, it is possible to perform hopping on a sequence of a same code index M using a boosted index differing according to a symbol. For instance, for a code type M=10, it is possible to use l=10 for a first symbol, l=20 for a second symbol, l=1 for a third symbol, and the like.

Figure 4:
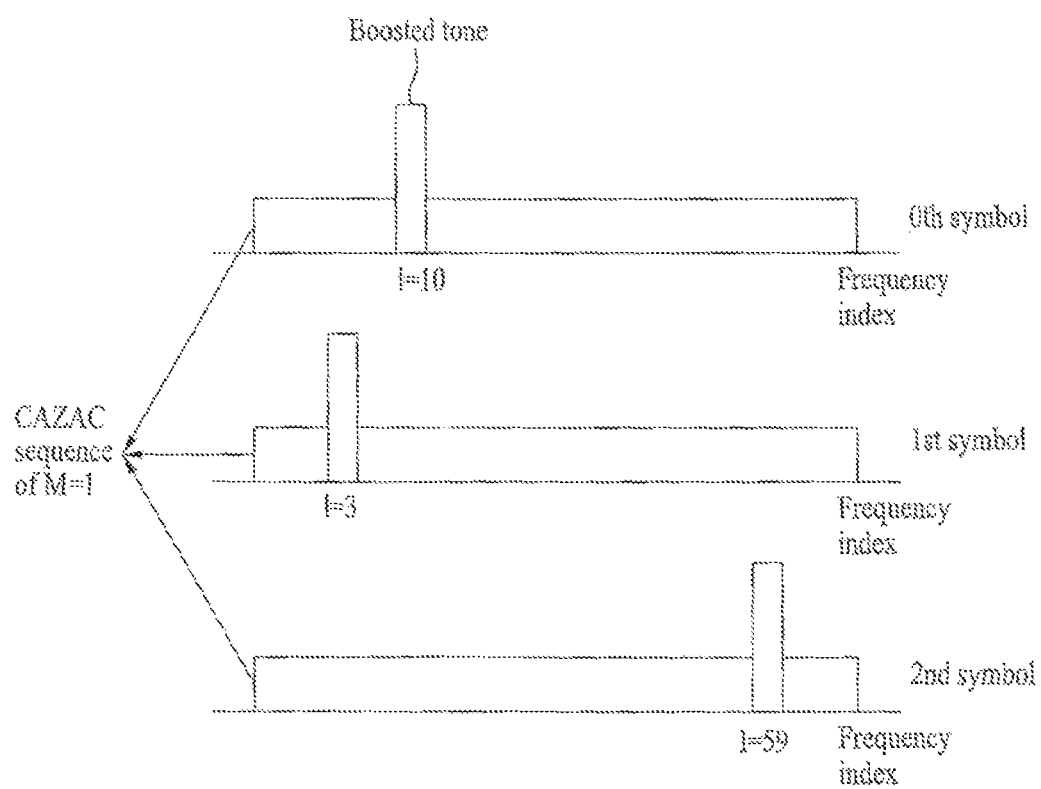
FIG. 4 is an exemplary diagram of a case where tones of symbols (l=10, l=3, l=59) are boosted using a CAZAC sequence (M=1) for three symbols according to one preferred embodiment of the present invention.

FIG. 4 is an exemplary diagram of a case that tones of symbols (l=10, l=3, l=59) are boosted in using a CAZAC sequence (M=1) for three symbols according to one preferred embodiment of the present invention. By the above-mentioned hoping method, it is able to reduce probability of cell search error that may be generated from deep fading that affects a boosted tone.

When $C_l^M(k)$ data-processed according to Equation 7 is received by the receiving side, it can be expressed as Equation 9.

$$R(k) = C_l^M(k)H^M(k) + N^M(k) \quad \text{[Equation 9]}$$

In this case, $H^M(k)$ is a value of fading that a sequence M undergoes by a $k^{th}$ sub-carrier and $N^M(k)$ is a value of AWGN (Additive White Gaussian Noise).

Since an $l^{th}$ tone of $C_l^M(k)$ is transmitted by being boosted, the receiving side need not execute the related art complicated operation for calculating correlation but executes a simple FFT demodulation process only to detect a cell ID on a frequency domain by searching for identification information for a boosted tone, i.e., a boosted index only.

In order for the receiving side to detect a code index (cell ID) by receiving the code sequence signal according to Equation 9, a boosted index l' is found using Equation 10 and then transformed into a code index M' using Equation 11.

$$l' = \arg\max_k\{|R(k)|\} \quad \text{[Equation 10]}$$

$$M' = \text{index}^{-1}(l) \quad \text{[Equation 11]}$$

In Equation 11, $\text{index}^{-1}(\bullet)$ indicates an index inverse transform function and has an inverse function relation with Equation 6.

Figure 5A:
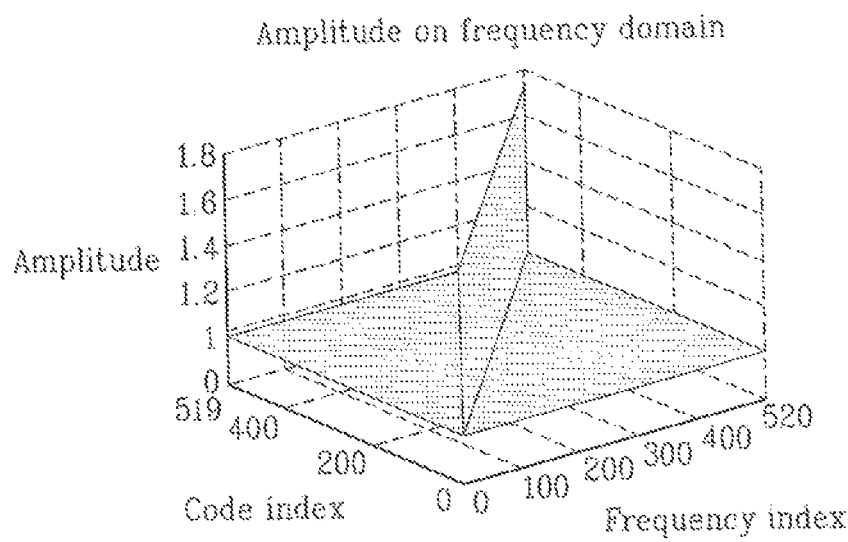
FIG. 5A and FIG. 5B are diagrams of amplitudes on frequency and time domains for 520 sequence types generated in single-tone added constant amplitude zero auto correlation (SA-CAZAC) when Ng=521 and λ=3 according to the present invention.
Figure 5B:
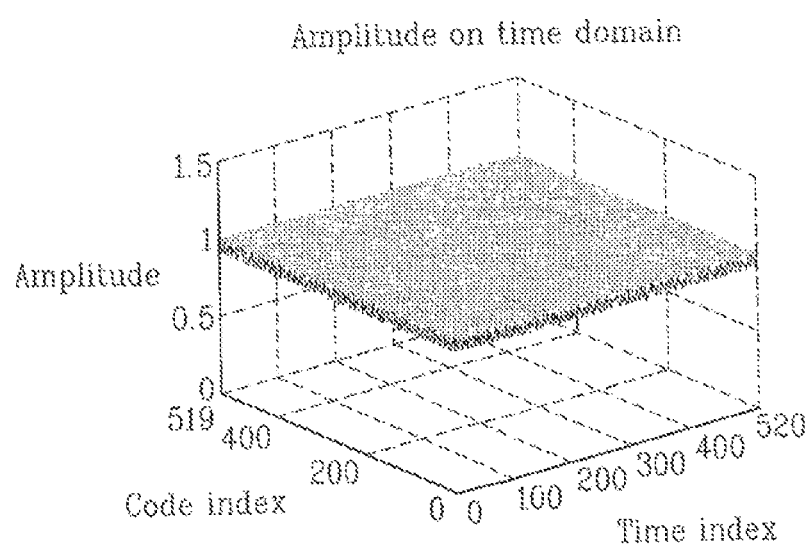

FIG. 5A and FIG. 5B are diagrams of amplitudes on frequency and time domains for 520 sequence types generated in SA-CAZAC if Ng=521 and λ=3 according to the present invention. In this case, a boosted index l for each sequence type is equal to a code index M (i.e., l=M). In this case, total 520 sequences can be generated. In case of performing a cell search using an original CAZAC sequence, a complex multiplication operation is carried out 520×(Ng−1) times for correlation value comparison and a code index M having the greatest value is then detected (total 521×520 (=270920) complex multiplications executed). Yet, in case of performing a cell search using a SZ-CAZAC sequence according to one embodiment of the present invention, an operation of searching powers or amplitudes of 521 (Ng) tones of a received signal is necessary only.

Table 1 shows average PAPR and maximum PAPR for every sequence available on a time domain in case of Ng=521 when a boosting factor λ varies from 1 to 15 in SA-CAZAC (identical to the above example) according to one embodiment of the present invention.

TABLE 1

| λ | Average PAPR [dB] | Maximum PAPR [dB] |
|---|---|---|
| 1 | 0 | 0 |
| 2 | 0.14787 | 0.147882 |
| 3 | 0.257537 | 0.257558 |
| 4 | 0.347471 | 0.3475 |
| 5 | 0.424824 | 0.424858 |
| 6 | 0.493257 | 0.493297 |
| 7 | 0.554946 | 0.554991 |
| 8 | 0.611308 | 0.611356 |
| 9 | 0.663324 | 0.663377 |
| 10 | 0.711712 | 0.711768 |
| 11 | 0.757009 | 0.757068 |
| 12 | 0.799635 | 0.799697 |
| 13 | 0.839923 | 0.839988 |
| 14 | 0.878143 | 0.878211 |
| 15 | 0.914516 | 0.914587 |

In this case, if λ=1, a sequence becomes identical to an original CAZAC sequence. The λ should be selected by considering a trade-off between PAPR and λ. Yet, as can be seen from Table 1, a PAPR value is not considerably degraded from an original CAZAC sequence if Ng=1 and λ≦15. And, the PAPR value stays within an operating range to cause no problem. Of course, a case of λ>15 is not excluded.

Figure 6A:
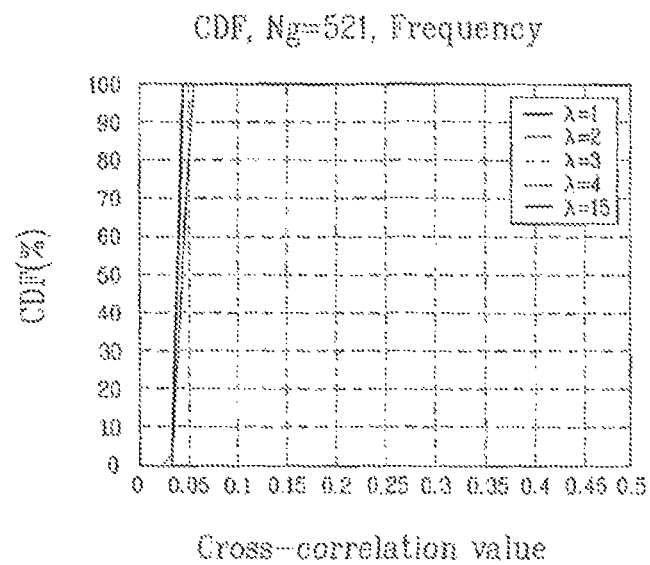
FIG. 6A and FIG. 6B are diagrams of CDF of circular cross-correlation for available 520 sequences according to a variation of λ for Ng=521 in SA-CAZAC according to one embodiment of the present invention.
Figure 6B:
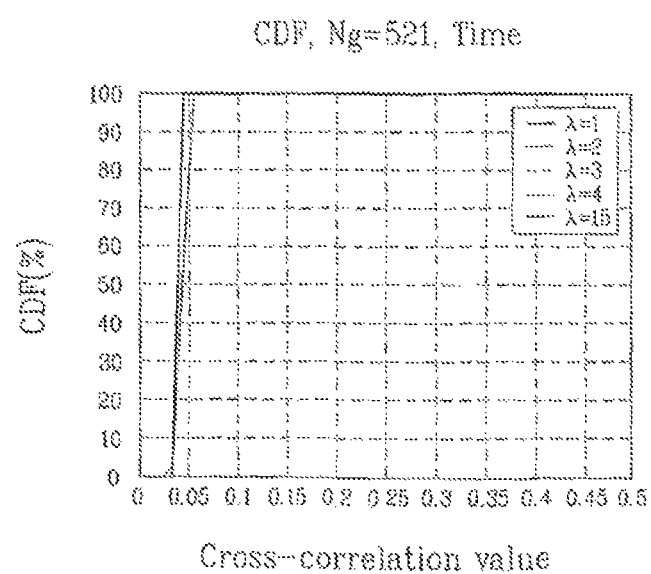

FIG. 6A and FIG. 6B are diagrams of CDF of circular cross-correlation for available 520 sequences according to a variation of λ=0~15) for Ng=521 in SA-CAZAC according to one embodiment of the present invention. It can be confirmed that a SA-CAZAC sequence according to one preferred embodiment of the present invention almost has no degradation of cross-correlation rather than an original CAZAC sequence. It is able to set a value of λ by considering a trade-off relation to correlation characteristic degradation for a considerably large λ. So, it can be confirmed that the proposed sequence is usable for such a purpose as a correlation based synchronization sequence and the like as well as a cell search.

According to another preferred embodiment of the present invention, it is able to consider a 2-step cell search scheme using one resource (e.g., one OFDM symbol) by a method of boosting a specific tone of a code sequence. In particular, a plurality of cells are divided into cell groups each of which includes at least one cell in a communication system. Information for identifying a specific cell group and information for identifying a specific cell belonging to the specific group by a method of boosting a specific tone of a code sequence are then represented. For instance, one code sequence including total N code elements can be regarded as N different code sequences according to a boosted code element index. Namely, since a receiving side is able to clearly discriminate a code sequence having a first code element boosted from another code sequence having a second code element boosted, the two code sequences can be regarded as different from each other.

For instance, if an index of a boosted code element, i.e., a boosted index is used for cell group ID discrimination and if an original sequence before being boosted is used for cell ID detection, the 2-step detection is possible. In this case, if a receiving side receives a code sequence having a specific tone boosted, the receiving side is able to perform a cell search process by searching boosted indexes, obtaining a cell group ID using the searched boosted index, and then obtaining a specific cell ID belonging to the cell group using an original sequence before boosting. In this case, the cell group ID matched to each boosted index and the specific cell ID according to each code sequence are the information that the receiving side should store in advance therein or know by a method of receiving the information by signaling from a transmitting side. On the other hand, it is also possible to use an original sequence before boosting for cell group ID discrimination and use identification information of a boosted code element, i.e., an boosted index for final cell ID detection.

For another embodiment, a specific CAZAC sequence is selected and different tone is boosted for the selected CAZAC sequence. It is then used as a cell search code sequence. For instance, in case that M=10 is used only in a CAZAC sequence of Ng=521, a number of cell IDs that can be generated for a corresponding sequence amounts to 521 (0~520). In this case, a boosting factor λ is set to 5. For instance, to use a same CAZAC sequence of M=10 as a synchronization channel used by all cells, a tone is differently boosted for each cell. In this case, since a correlation value between SA-CAZAC sequences of which tones are differently boosted is considerably large, the sequences are regarded as the almost same sequences. Due to this characteristic, it is able to obtain initial synchronization by the same process as using an original CAZAC sequence. And, it is also possible to perform cell discrimination by simple amplitude comparison in a manner of transforming corresponding signals into frequency domain signals through simple FFT demodulation.

Figure 7A:
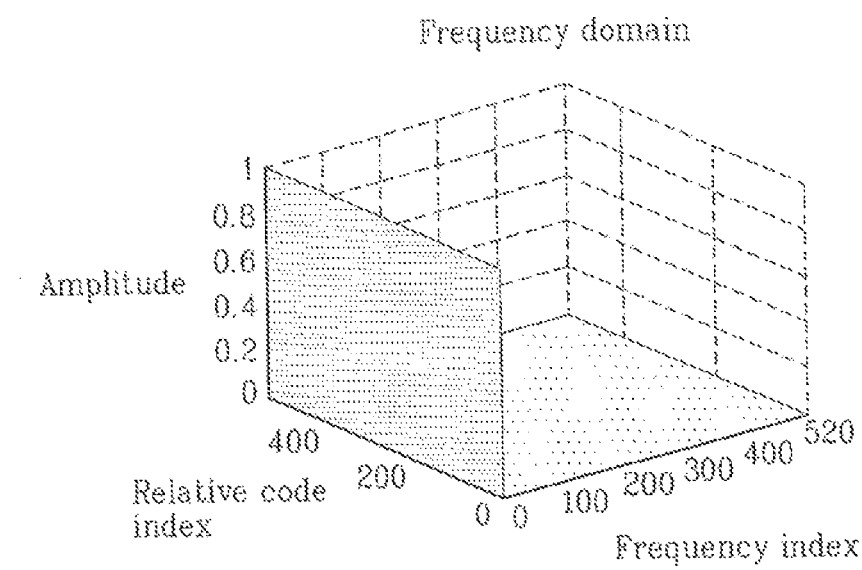
FIG. 7A and FIG. 7B are diagrams of circular cross-correlation between a sequence having $0^{th}$ tone boosted in a CAZAC sequence (M=10) and 520 sequences having the rest of the boosted indexes.
Figure 7B:
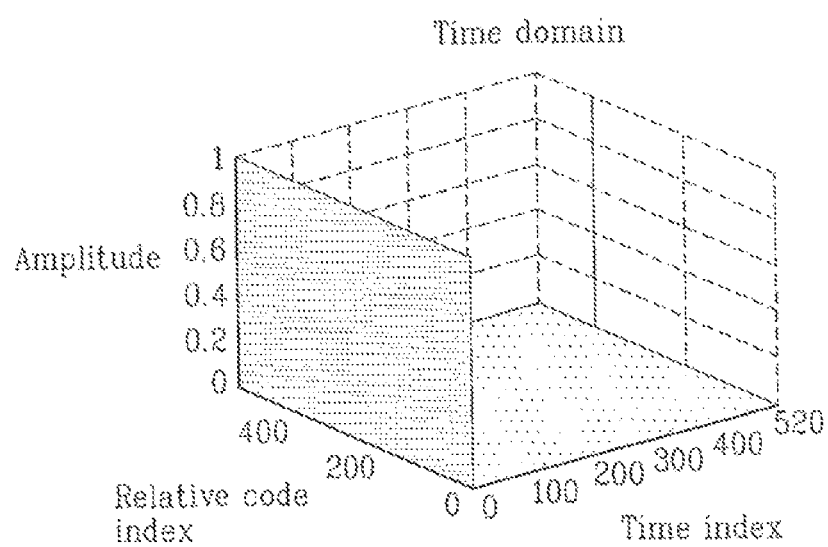

FIG. 7A and FIG. 7B are diagrams of circular cross-correlation between a sequence having $0^{th}$ tone boosted in a CAZAC sequence (M=10) and 520 sequences having the rest of the boosted indexes. Referring to FIG. 7A and FIG. 7B, according to a correlation result between sequences in case that tones boosted for a same M are differentiated, it is observed that the sequences can be regarded as the almost same sequences. If this method is applied to a common SCH (synchronization channel) on which all cell use a same sequence, it is able to perform fast synchronization acquisition. And, it is also possible to perform a cell search via the SCH.

Figure 8:
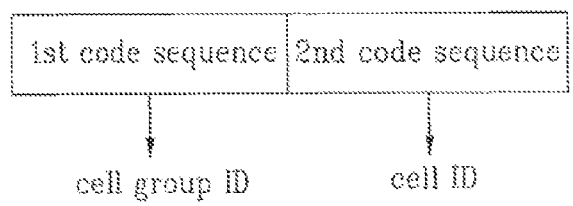
FIG. 8 is a diagram to explain another preferred embodiment of the present invention.

FIG. 8 is a diagram to explain another preferred embodiment of the present invention. In the embodiment explained with reference to FIG. 8, a cell search is carried out by a 2-step process using at least two resources (e.g., at least two OFDM symbols) by a method of boosting a specific tone of a code sequence.

Referring to FIG. 8, a transmitting side, i.e., a specific cell transmits first and second code sequences to a receiving side for two OFDM symbols, respectively. In this case, the two OFDM symbols are located adjacent to each other or spaced apart from each other by predetermined symbols. The first code sequence is provided to inform the receiving side of a cell group ID for identifying a specific cell group including at least one cell, and the second code sequence is provided to indicate a cell ID for identifying a specific cell included in the specific cell group identified by the first code sequence. A specific tone of at least one of the first and second code sequences is boosted and transmitted. Each of the first and second code sequences can be transmitted in a format of reference signals such as a preamble, a midamble, and a pilot signal.

The code sequence transmitting method can be classified into three transmission types according to which one of the first and second code sequences will have a specific tone boosted. A first method is carried out in a manner of boosting a specific tone of the first code sequence without applying boosting to the second code sequence. A second method is carried out in a manner of boosting a specific tone of the second code sequence without applying boosting to the first code sequence. And, a third method is carried out in a manner of boosting specific tones of both of the first and second sequences.

In FIG. 8, a process for the receiving side to obtain a cell group ID by the first code sequence is named 'first step' and a process for the receiving side to obtain a cell group ID by the second code sequence is named 'second step'. Assuming that there are four cell groups, it is able to identify each of the cell groups using four kinds of different code sequences as the first code sequences. Assuming that maximum 130 cells are included in each of the cell groups, there should exist at least 130 second code sequences. (In case of not considering the 2-step cell search process, it is able to use 516 (=520−4) kinds of sequences are usable as code sequences. Yet, since the 2-step search process is taken into consideration, 130 kinds of sequences are considered only.) Hence, the number of total cell IDs amounts to 520(=4*130). In the following example, it is assumed that the cell group ID including the cell having transmitted the first and second code sequences is '2' and that the cell ID is '128'.

In case that the transmitting side transmits the first and second code sequences for the continuous or separate two symbols by one of the first to third methods, the receiving side searches for a cell group ID by receiving the first code sequence and then searches for a cell ID by receiving the second code sequence, in the first step. According to the first to third methods, the receiving side receives the first code sequence of which specific tone is boosted (first method, third method) or the first code sequence of which specific tone is not boosted (second method). Alternatively, the receiving side receives the second code sequence of which specific tone is not boosted (first method) or the second code sequence of which specific tone is boosted (second method, third method). A detailed operational process of the receiving side in the first and second steps is explained as follows.

In the following embodiments, it is assumed that the first and second code sequences are not overlapped with each other, that an inserted sequence length is Ng=520, and that a CAZAC sequence or an SA-CAZAC sequence generated from boosting a specific tone of a random CAZAC sequence. In generating a CAZAC sequence of Ng=520, it is able to use a method of generating a sequence having a prime number length of Ng'=521 and discarding a last one to generate a sequence of 520. By the above method, a number of usable CAZAC sequences can be increased.

First Step (1) Case that a Transmitting Side Transmits a CAZAC Sequence of which Specific Tone is not Boosted (Second Method)

In case that the transmitting side transmits a CAZAC sequence of which specific tone is not boosted, the receiving side detects a cell group ID using correlations between the received CAZAC sequence and a plurality of CAZAC sequences usable as cell group IDs already known by the receiving side.

For instance, in case of four kinds of CAZAC sequences of cell group ID (Mg)=1, 2, 3, and 4 is used as the first code sequence to identify four cell groups, the receiving side can detect a cell group ID (Mg') according to Equation 12.

$$M'_g = \arg\{\max_m(|r^H c^m|)\}, m = 1, 2, 3, 4 \quad \text{[Equation 12]}$$

In this case, r is a column vector indicating a received signal and $c^m$ is a CAZAC sequence having a cell group index m.

For instance, if the transmitting side transmits a CAZAC sequence of Mg=2 in the first step and if the receiving side detects a CAZAC sequence of Mg'=2 from the received signal, a cell group ID indicated by the first code sequence is '2'.

(2) Case that a Transmitting Side Transmits a CAZAC Sequence of which Specific Tone is Boosted (First Method, Second Method)

Figure 9:
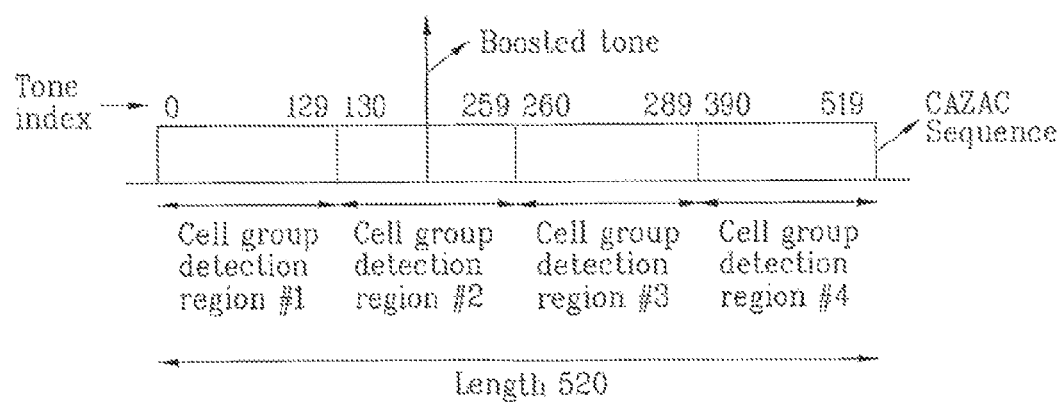
FIG. 9 is a diagram to explain a method of detecting a cell group ID in a manner that a transmitting side transmits a specific tone boosted CAZAC sequence in a first step and that a receiving side receives the CAZAC sequence according to one embodiment.

FIG. 9 is a diagram to explain an example of detecting a cell group ID in a manner that a transmitting side transmits a specific tone boosted CAZAC sequence in a first step and that a receiving side receives the CAZAC sequence according to one embodiment.

Referring to FIG. 9, the transmitting side divides an overall tone into a number (in this case, four) of cell group IDs in the first step, boosts a central tone of the corresponding group, and then transmits the boosted tone. FIG. 9 exemplarily shows that a tone corresponding to a tone index 194 is boosted and transmitted in case that the cell group ID transmitted by the transmitting side is '2'. In this case, both of the transmitting side and the receiving side should have already known information for the respective cell group ID areas by agreement in advance or signaling.

The receiving side receives a CAZAC sequence, as shown in FIG. 9, transmitted by the transmitting side, performs demodulation thereon, and then detects a boosted tone within a specific cell group search region. If so, the receiving side is able to search a cell group ID corresponding to the specific cell group search region from which the boosted tone was detected. The receiving side detects the boosted specific tone by receiving the SA-CAZAC sequence, which can be performed by simple FFT demodulation. So, an operation can be simplified. In the embodiment shown in FIG. 9, the example shows the cell group ID number is four. Yet, in case of performing final cell ID detection in the second step, it is possible to provide more cell groups to perform the detection by a simpler process.

Second Step

In the first step, it is assumed that there are four cell groups and that each of the cell groups includes maximum 130 cells. Since the cell group ID is detected in the first step, the second step needs to detect a specific cell ID from maximum 130 cells included in a specific cell group.

(1) Case that the Transmitting Side Transmits a CAZAC Sequence of which Specific Tone is not Boosted (First Method)

In the second step, if the transmitting side transmits a CAZAC sequence of which specific tone is not boosted to enable the receiving side to retrieve a cell ID, the receiving side detects a cell ID by taking correlations between the received CAZAC sequence and a plurality of CAZAC sequences known in advance. Since the receiving side obtains the cell group ID via the first step, it is able to obtain a final cell ID by finding correlation between the received CAZAC sequence and cell identification CAZAC sequences of the cells included in the cell group corresponding to the cell group ID.

For instance, assuming that it is able to use 130 kinds (Mg=1, ..., 130) of CAZAC sequences, the receiving side is able to detect a cell ID by Equation 13.

$$M' = \arg\{\max_m(|r^H c^m|)\}, m = 5, \ldots, 134 \quad \text{[Equation 13]}$$

In this case, r is a column vector indicating a received signal and $c^m$ is a CAZAC sequence having an index m.

And, the detected cell ID is used to decide a final cell ID together with the cell group ID detected by the first step. For instance, if a CAZAC sequence corresponding to Mg=129 is transmitted in the second step and if Mg'=130 is detected, a combination of a final cell ID becomes {(cell group ID in first step)-(cell ID in second step)}=(2-128).

(2) Case that Transmitting Side Transmits CAZAC Sequence of which Specific Tone is Boosted (Second Method, Third Method)

Figure 10:
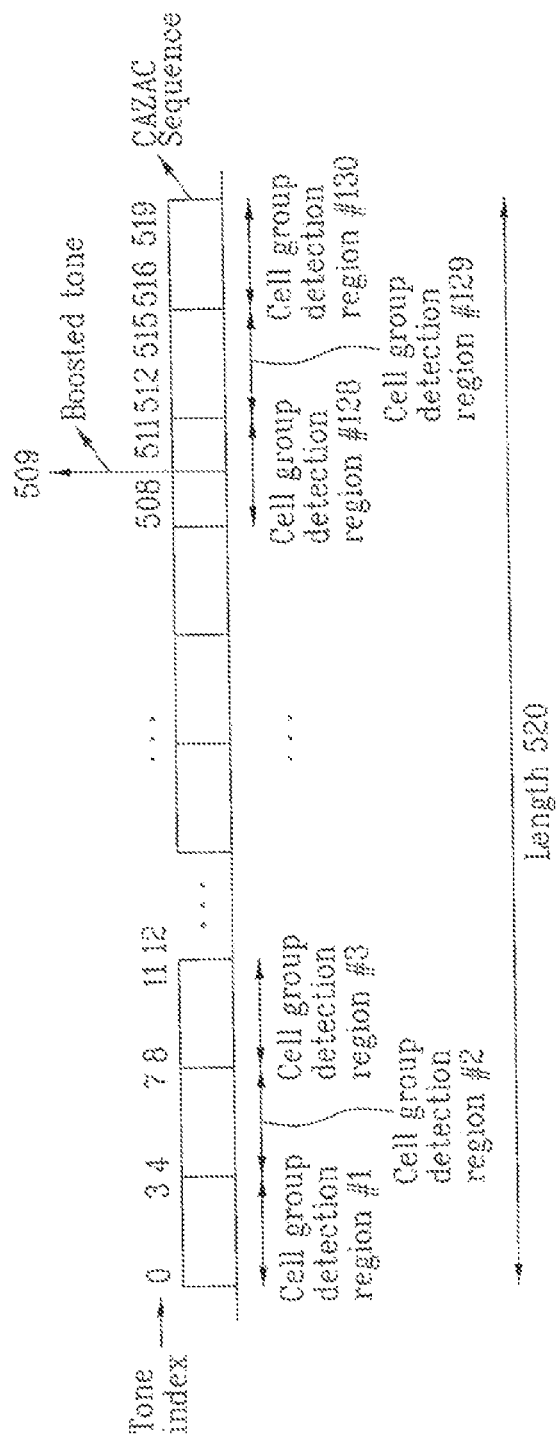
FIG. 10 is a diagram to explain a method of detecting a cell group ID in a manner that a transmitting side transmits a specific tone boosted CAZAC sequence in a second step and that a receiving side receives the CAZAC sequence according to one embodiment.

FIG. 10 is a diagram to explain an example of detecting a cell group ID in a manner that a transmitting side transmits a specific tone boosted CAZAC sequence in a second step and that a receiving side receives the CAZAC sequence according to one embodiment.

Referring to FIG. 10, if an overall tone for a CAZAC sequence having an overall length 520 is divided into 130 cell search regions, each of the cell search regions corresponds to each cell included in the specific cell group detected by the first step. The transmitting side, i.e., the cell to which the transmitting side currently belongs boosts a specific tone included in the cell search region corresponding to its cell ID and then transmits it to the receiving side. In FIG. 10, the example shows that a $509^{th}$ tone included in $128^{th}$ cell search region is boosted and transmitted. If the receiving side receives and demodulates the SA-CAZAC sequence, as shown in FIG. 10, it is able to detect the boosted tone. So, a number of the cell search region having the boosted tone included therein is detected as a cell ID.

As another preferred embodiment of the present invention, for a code sequence set including a plurality of code sequences, it is able to consider a method of varying a position (boosted index) of a boosted tone of each of the code sequences included in the code sequence set.

For instance, although code sequence types available for a CAZAC sequence of Ng=21 are total 520, since the type number of boosted indexes can be set to 521 for each of the code sequences, it is able to extend the sequence types to total 270,920 (=521×520) types. In particular, in case that the transmitting and receiving sides share a CAZAC sequence set of Ng=521, it is able to discriminate maximum 520 cells by the CAZAC sequence if a specific tone is not boosted. Yet, by varying a position of the boosted tone for each CAZAC sequence, it is able to discriminate maximum 270,920 cells from. Hence, it is able to extend the number of code sequences available for cell search.

In case of employing this method, the receiving side has to perform cell search through two steps including a boost index search and a final code sequence search. In particular, in case of receiving a code sequence having a randomly boosted index from the transmitting side, the receiving side is able to detect a cell to which the receiving side itself belongs by searching for the boosted index and then searching for a final code sequence. In this case, since one cell can be identified by a boosted index and a code index, it is able to represent a specific cell ID as a format of 'A-M'. In this case, 'A' is a boosted index and 'M' is a code index of a CAZAC sequence. In other words, 'A-M' indicates a code sequence of which $A^{th}$ tone of an $M^{th}$ code sequence is boosted. In a CAZAC code sequence of Ng=521, 'A' has one of 0, 1, . . . , and 520 and 'M' has one of 1, . . . , and 520.

Figure 11A:
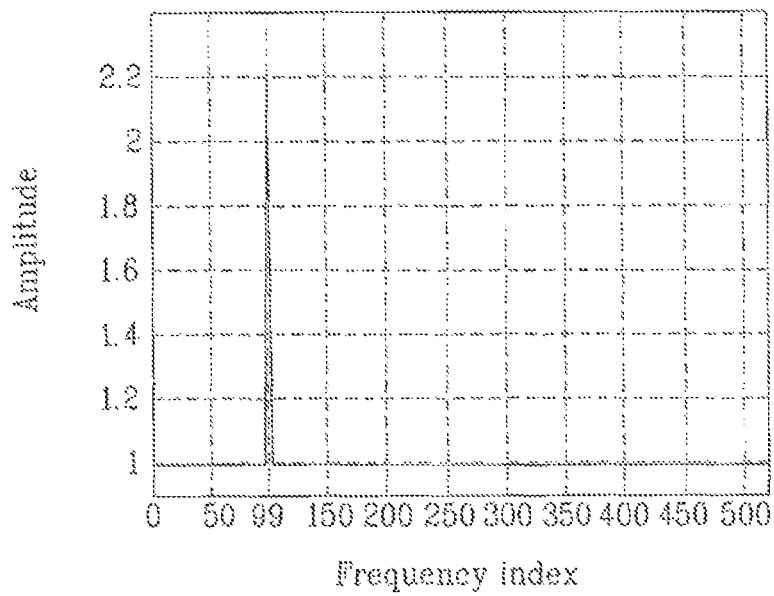
FIG. 11A and FIG. 11B are diagrams of a signal amplitude on a frequency domain of a code sequence transmitted according to one preferred embodiment of the present invention and an amplitude on a time domain after completion of IFFT, respectively.
Figure 11B:
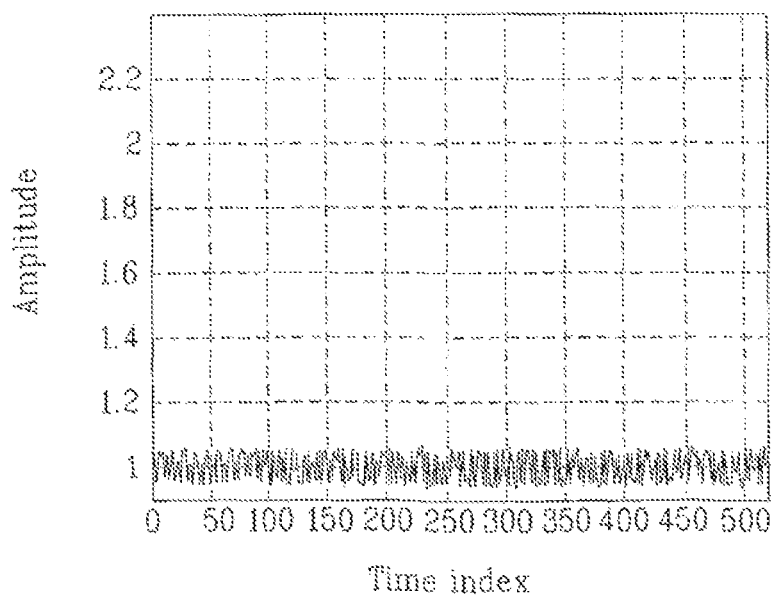

In case that the transmitting side, i.e., a specific cell boosts a $99^{th}$ tone of a CAZAC code sequence corresponding to a code index '10' with a boosting factor λ ('99-10') and then transmits it to the receiving side, a signal amplitude on a frequency domain of a transmitted code sequence and an amplitude on a time domain after completion of IFFT are shown in FIG. 11A and FIG. 11B, respectively.

For convenience of explanation, if the receiving side receives intact signals transmitted by the transmitting side, if signals received on a time domain are set to r (column vector), and if frequency domain signals after FFT are set to R (column vector), the receiving side is able to detect a boosted index using Equation 10. Once the boosted index is detected, correlation between a received code index and 520 kinds of sequences $C^M$ (M=1, 2, . . . , 520) (column vector) known in advance by the receiving side is calculated using Equation 14. A code index corresponding to a greatest value is then found.

$$B' = \arg\left\{\max_g\left(\left|\frac{l}{N_g}R^H C^M\right|\right)\right\}$$ [Equation 14]

Figure 12A:
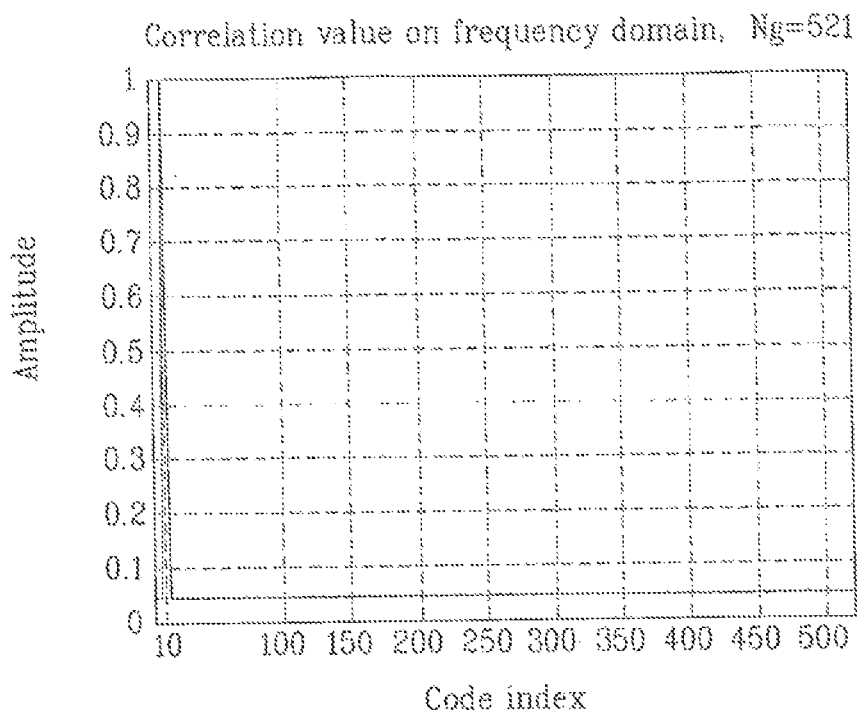
FIG. 12A and FIG. 12B are diagrams of correlation results between a signal R received according to one preferred embodiment of the present invention and all sequence $C^M$.
Figure 12B:
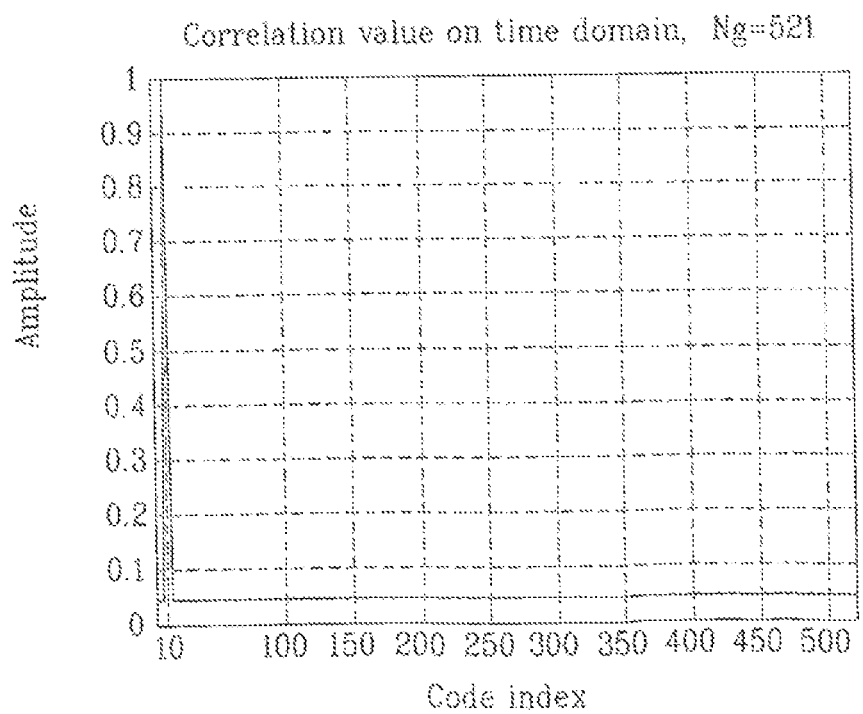

FIG. 12A is a diagram of a correlation result between the signals R received on a frequency domain and all sequence $C^M$ on the above condition. If the signals r received on the time domain and the time domain value $c^M$ of $C^M$ are already known, the corresponding correlation result is shown in FIG. 12B. Namely, it is able to detect M' on a frequency domain for the received signals. And, it is also possible to directly detect M' without boosted index detection on a time domain.

Figure 13A:
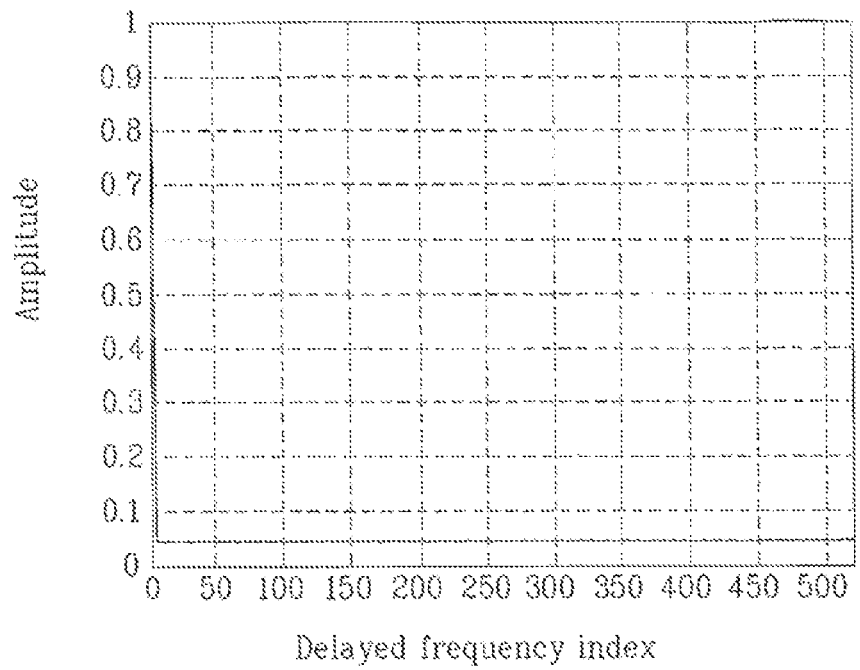
FIG. 13A and FIG. 13B are diagrams of circular cross-correlations between '99-10' SA-CAZAC sequence and '199-10' SA-CAZAC sequence on frequency and time domains, respectively.
Figure 13B:
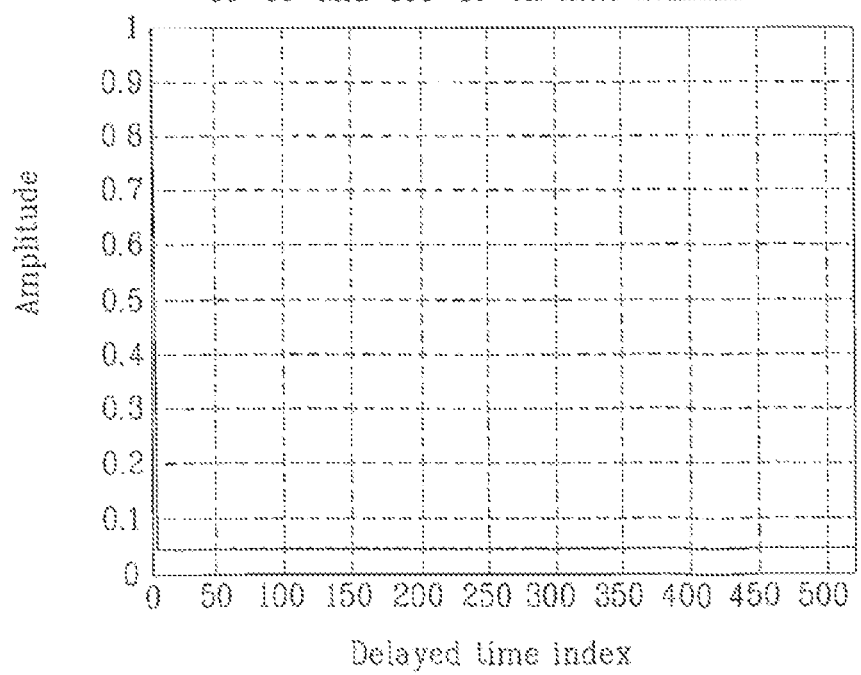

In case that a specific tone is boosted by varying a boosted index for a same CAZAC sequence, a SA-CAZAC sequence of '99-10' and a SA-CAZAC sequence of '199-10' does not maintain low correlation for example. FIG. 13A and FIG. 13B are diagrams of circular cross-correlations between '99-10' SA-CAZAC sequence and '199-10' SA-CAZAC sequence on frequency and time domains, respectively. In other words, in case of differentiating a position (boosted index) of a boosted tone for a specific CAZAC sequence, separation using correlation is difficult. Namely, in a code sequence regarded as the same signal having an index 'A-M', it is difficult to detect a value of 'A' through correlation.

The above-mentioned technical features of the present invention are applicable to the currently discussed 3GPP LTE (long term evolution) system. A cell search method discussed by the 3GPP LTE can be basically classified into the following three types.

1) Case of performing synchronization acquisition and cell identification with a different SCH (synchronization channel) sequence for each cell 2) Case that every cell performs synchronization using a same sequence and performs cell identification by a reference signal (pilot signal)

3) Case of performing cell group identification and synchronization acquisition using a sequence of different SCH and final cell identification per cell group To the above three kinds of cases, the detailed cell search methods according to the preferred embodiments of the present invention are applicable. In particular, if the technical features of the present invention are applied to the case 2), it is able to bring about the same effect as using the same sequence per cell for SCH without reference signals.

And, a CP (cyclic prefix) for an OFDM symbol of a current LTE downlink is supposed to use one of 'long CP' and 'short CP' within one sub-frame. A SA-CAZAC sequence according to the present invention is advantageous in finding a boosted tone index regardless of 'short' or 'long' even if FFT is executed with reference to 'short CP'.

The above explained technical features of the present invention are usable for other usages as well as the cell search process in the mobile communication system. For instance, if a transmitting side transmits a code sequence in accordance with an embodiment of the present invention on a specific channel such as a random access channel (RACH), a control channel, a traffic channel, and the like, a receiving side efficiently searches for the code sequence. So, the code sequence of the present invention can be used for information search on the specific channel. The receiving side is able to obtain prescribed information previously agreed with the transmitting side using at least one of identification information for at least one boosted tone, e.g., a boosted index and identification information for the received code sequence itself. If the receiving side receives a code sequence of which at least two tones are boosted, it is also possible to obtain prescribed information previously agreed between the transmitting side and the receiving side using a combination of the identification information for the at least two boosted tones.

Figure 14:
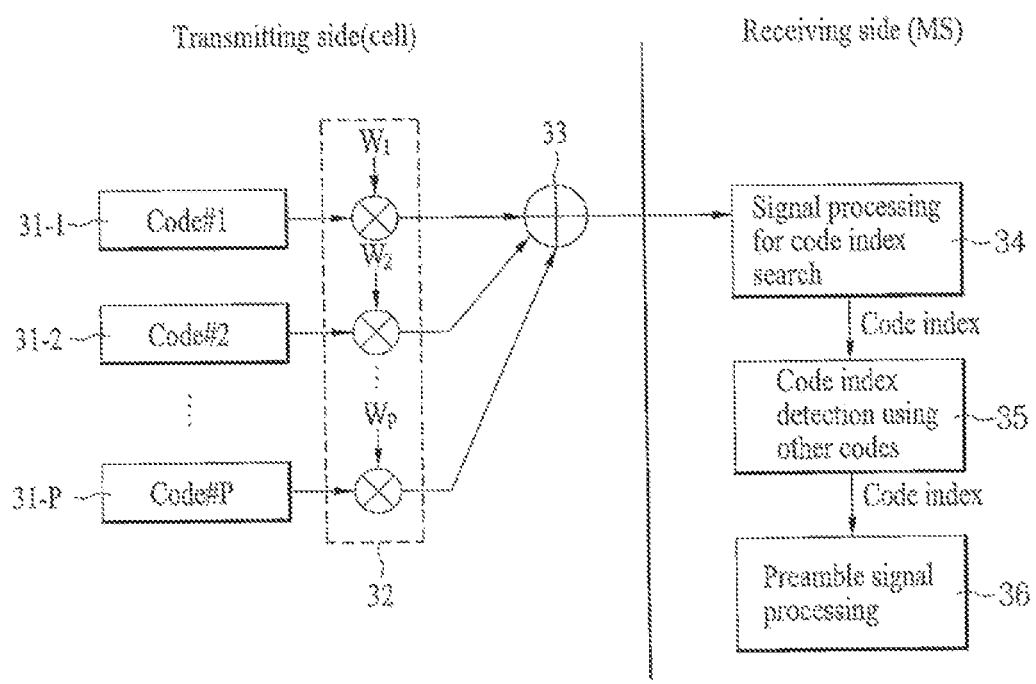
FIG. 14 is a diagram of a process for preamble generation and detection using a multi-code set according to another preferred embodiment of the present invention.

FIG. 14 is a diagram of a process for preamble generation and detection using a multi-code set according to another preferred embodiment of the present invention.

One embodiment according to the present invention provides a method of enabling a mobile station to detect a cell more efficiently. As an embodiment of the present invention, a method of detecting a cell efficiently by simplifying algorithm of a receiving side using a preamble code is provided. In order to enable a cell to be effectively detected, a cell combines different codes having specific characteristics together and then transmits the combined codes. If so, a mobile station enables simpler, faster and more accurate cell search using the characteristics of the combined codes.

First of all, an example of a method of mixing at least two codes having different characteristics and transmitting the mixed codes is explained as follows. If a number of code sets to use is P, the code sets are represented as $C_1, C_2, \ldots, C_P$ and each of the codes configuring the corresponding code set can be represented as $c_j^k$. In this case, $c_j^k$ indicates a $k^{th}$ code in a $j^{th}$ code set. If each element of $c_j^k$ is represented as $c_j^k(n)$, a combined code can be expressed as Equation 15.

$$s_k(n) = \sum_{j=1}^{P} w_j c_j^k(n) \qquad [\text{Equation 15}]$$

In Equation 15, $S_k$ is a preamble code corresponding to a $k^{th}$ cell and $w_j$ is a weight for each code set. Hence, in transmitting $s_k$ from the $k^{th}$ cell, it is able to modify the weight $w_j$ to transmit each time. Namely, it is able to use a different preamble code set for each transmission time. Although several preamble code sets are used, it is able to further reveal characteristics of a specific code received by a receiving side at a specific time by applying a different weight for the transmission. For instance, if an easily detectable code is combined with a preamble code and is then transmitted, a mobile station is able to detect a cell by detecting a code set signal transmitted at a specific time without retrieving all code sets. And, code or synchronization information can be substantially acquired using different code set information.

Referring to FIG. 14, a transmitting side combines codes (31-1~31-p) respectively selected from P code sets different from each other in characteristics (33) and then transmits the combined codes. In this case, by giving a corresponding weight to each code set (32), it is able to further reveal a characteristic of a code having a specific characteristic. A receiving side having received the combined codes performs a first code index detection (34). For instance, it is able to detect a code index using a line search using DFT and correlation. Code re-detection is then performed using a second code (35). Signal processing is performed using the detected code index (36). For instance, cell search and time and frequency synchronizations can be performed.

In the following description, as an example of the code combination set, a combination between a CAZAC sequence and a single tone sequence is explained. If $C_1$ is a CAZAC sequence code set, $C_1$ includes codes shown in Equation 16.

$$C_1 = \begin{bmatrix} \left\{\exp\left(\frac{i\pi 101}{M}\right), \exp\left(\frac{i\pi 112}{M}\right), \ldots, \exp\left(\frac{i\pi 1(M-1)M}{M}\right)\right\}, \\ \left\{\exp\left(\frac{i\pi 201}{M}\right), \exp\left(\frac{i\pi 212}{M}\right), \ldots, \exp\left(\frac{i\pi 2(M-1)M}{M}\right)\right\}, \ldots, \\ \left\{\exp\left(\frac{i\pi (M-1)01}{M}\right), \exp\left(\frac{i\pi (M-1)12}{M}\right), \ldots, \exp\left(\frac{i\pi (M-1)(M-1)M}{M}\right)\right\} \end{bmatrix} \quad [\text{Equation 16}]$$

In Equation 16, a first code $c_1^1$ belonging to $C_1$ is $$\exp\left(\frac{i\pi 101}{M}\right), \exp\left(\frac{i\pi 112}{M}\right), \ldots, \exp\left(\frac{i\pi 1(M-1)M}{M}\right),$$

a second code $c_1^2$ belonging to $C_1$ is $$\exp\left(\frac{i\pi 201}{M}\right), \exp\left(\frac{i\pi 212}{M}\right), \ldots, \exp\left(\frac{i\pi 2(M-1)M}{M}\right),$$

and a last code $c_1^M$ belonging to $C_1$ is $$\exp\left(\frac{i\pi (M-1)01}{M}\right), \exp\left(\frac{i\pi (M-1)12}{M}\right), \ldots, \exp\left(\frac{i\pi (M-1)(M-1)M}{M}\right).$$

In this case, 'M' indicates a code length.

If $C_2$ is a single tone code set, $C_2$ includes codes according to Equation 17.

$$C_2 = \begin{bmatrix} \left\{\exp\left(\frac{i 2\pi 00}{M}\right), \exp\left(\frac{i 2\pi 01}{M}\right), \ldots, \exp\left(\frac{i 2\pi 0(M-1)}{M}\right)\right\}, \\ \left\{\exp\left(\frac{i 2\pi 10}{M}\right), \exp\left(\frac{i 2\pi 11}{M}\right), \ldots, \exp\left(\frac{i 2\pi 1(M-1)}{M}\right)\right\}, \ldots, \\ \left\{\exp\left(\frac{i 2\pi (M-1)0}{M}\right), \exp\left(\frac{i 2\pi (M-1)1}{M}\right), \ldots, \exp\left(\frac{i 2\pi (M-1)(M-1)}{M}\right)\right\} \end{bmatrix} \quad [\text{Equation 17}]$$

In Equation 17, a first code $c_2^1$ belong into $C_2$ is $$\exp\left(\frac{i 2\pi 00}{M}\right), \exp\left(\frac{i 2\pi 01}{M}\right), \ldots, \exp\left(\frac{i 2\pi 0(M-1)}{M}\right),$$

a second code $c_1^2$ belonging to $C_2$ is $$\exp\left(\frac{i 2\pi 10}{M}\right), \exp\left(\frac{i 2\pi 11}{M}\right), \ldots, \exp\left(\frac{i 2\pi 1(M-1)}{M}\right),$$

and a last code $c_1^3$ belonging to $C_2$ is $$\exp\left(\frac{i 2\pi (M-1)0}{M}\right), \exp\left(\frac{i 2\pi (M-1)1}{M}\right), \ldots, \exp\left(\frac{i 2\pi (M-1)(M-1)}{M}\right).$$

In this case, 'M' indicates a code length.

If signals received by the receiving side are interpreted, it is given by Equation 18.

$$s_{fk} = F s_k = F w_1 c_1^k + F w_2 c_2^k + F a \qquad [\text{Equation 18}]$$

In Equation 18, 'F' indicates a Fourier transform matrix and 'a' indicates a noise vector.

A CAZAC sequence has the feature shown in Equation 19.

$$|c_1^k(n)| = 1 \text{ and } |c_{f1}^k(n)| = x_1 \qquad [\text{Equation 19}]$$

Meanwhile, a single tone sequence has the feature shown in Equation 20.

$$|c_{f2}^k(n)| = 1 \text{ and } |c_{f2}^k(n)| = \begin{cases} M, & n = k \\ 0, & n \neq k \end{cases} \quad \text{[Equation 20]}$$

In Equation 19 and Equation 20, $c_{f1}^k$ and $c_{f2}^k$ result from transforming the CAZAC sequence and the single tone sequence on a frequency domain, respectively. In particular, the CAZAC sequence CAZAC is a constant having a uniform amplitude on time and frequency domains. The single tone sequence is a constant on a time domain but has an impulse (Dirac Delta) function format on a frequency domain. Hence, an amplitude of a frequency domain signal on a time domain can be expressed as Equation 21.

$$|s_{fk}| = |Fw_1c_1^k + Fw_2c_2^k + Fa| < |c_{f1}^k| + |c_{f2}^k| + |Fa| \quad \text{[Equation 21]}$$

Yet, if n≠k, it is $|c_{f1}^k| \gg |c_{f2}^k|$. If n=k, it is $|c_{f1}^k| \ll |c_{f2}^k|$. Since |Fa| is a very small value, Equation 21 can be expressed as Equation 22.

$$|s_{fk}| \approx |c_{f1}^k| + |c_{f2}^k| + |Fa| \quad \text{[Equation 22]}$$

Accordingly, if Equation 22 indicating a signal on a frequency domain is referred to in order to find a received preamble code, it is able to recognize what is the transmitted code via the information obtained from a single tone. Since a value in case of n=k is considerably different from a value in case of n≠k, it is able to find the transmitted code using a maximum value. A method of finding an index of a transmitted code using a single code is represented as Equation 23.

$$K^* = \arg\max_{n=0,1,\ldots,M-1} |s_{fk}(n)| \quad \text{[Equation 23]}$$

Hence, an index K* of a transmitted CAZAC sequence is found using the value detected by the above method. It is then able to acquire time and frequency synchronization using this. Actually, transmitted signals are actually distorted or frequency synchronization is not matched between transmission and reception as soon as a transmission filter is added. So, a pulse is not detected from a single position of the received signals. In case of searching codes, it is reasonable that detection should be attempted for another code in the vicinity of a position of a peak detected according to Equation 23.

A cost function for detecting a pulse from several positions is expressed as Equations 24 to 26. First of all, a correlation value with a received signal is calculated for other codes in the vicinity of the peak detected by Equation 23.

$$R_q(\tau) = \sum_{n=0}^{M-1} s_k(n) c_1^q(n+\tau) \quad \text{[Equation 24]}$$

In Equation 24, $R_q(\tau)$ is a correlation value with a $q^{th}$ code. In this case, 'q' may become the value K* determined by Equation 23 or one of a plurality of different values in the vicinity of the value K*.

Like Equation 25, peaks in the vicinity of the position of the peak detected by Equation 23 are searched using a maximum value of the correlation value.

$$J(q) = \max R_q(\tau) \quad \text{[Equation 25]}$$

Like Equation 26, a maximum peak value is found among values resulting from multiplying peak values detected by Equation 25 by the peak values detected by Equation 23.

$$K^* = \arg\max_q |s_{fk}(q)| J(q) \quad \text{[Equation 26]}$$

It is able to obtain an index K* of a preamble code using the code corresponding to the maximum peak value. It is then able to search neighbor cells using it.

In this case, instead of multiplying peak values detected by Equation 25 by the peak values detected by Equation 23, addition or other operations are executed. The transmitted preamble code is then found using a maximum value.

Meanwhile, like Equation 15, since a power is scattered by the weight $w_j$, distributed powers should be taken into consideration in calculating time and frequency synchronization. Hence, it is able to maintain synchronization performance only if algorithm is executed using the two codes.

Besides the transmission of the different code type combination, by performing a differently weighted transmission (time difference transmission using independent codes), it is able to perform simpler and more efficient cell search.

While the present invention has been described and illustrated for the purpose of cell search through code sequence modifications according to the technical features of the present invention, it will be apparent to those skilled in the art that the technical features of the present invention are applicable to such a communication system function performed using the code sequence as initial synchronization, time and frequency synchronization acquisition, channel estimation, and the like.

Accordingly, the present invention provides the following effects.

First of all, a receiving side, i.e., a terminal is able to detect a cell ID by simple amplitude comparison only after FFT demodulation, whereby complexity of the receiving side for cell search can be reduced.

Secondly, by reducing a cell search time, fast initial acquisition is possible.

Thirdly, fast cell search for handover is possible.

Fourthly, detection error probability in cell search is lowered.

Fifthly, by using common SCH to acquire fast initial acquisition and performing cell discrimination with it, the present invention achieves two objects of resource saving and fast cell search.

Sixthly, sequence types available for cell search can be extended.

Seventhly, in an OFDM symbol that used at least tow kinds of CP lengths, it is able to perform cell search regardless of the CP length.

Eighthly, despite providing the above effects, degradation of major characteristics (good correlation, low PAPR, etc.) of the original CAZAC sequence is prevented.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to a wireless communication system such as a mobile communication system, a wireless internet system, and the like.

What is claimed is:

1. A method for transmitting a signal for cell searching in a mobile communication system having a multi-cell environment, the method comprising:
   transmitting the signal to one or more receiving party devices within a cell,
   wherein the signal is used for a synchronization of the one or more receiving party devices within the cell,
   wherein the signal is defined by a combination of a first code sequence derived from a first index and a second code sequence derived from a second index,
   wherein a combination of the first index and the second index permits identification of an identity of the cell, wherein the first index includes a cell group identifier for identifying a cell group including the cell, and wherein the second index includes a cell identifier for identifying the cell included in the cell group identified by the cell group identifier, and wherein the first index is different from the second index, and
   wherein the length of the first code sequence and the length of the second code sequence are identical.

2. The method of claim 1, wherein the signal is further defined by a concatenation of the first code sequence and the second code sequence at a frequency domain.

3. A method for receiving a signal for cell searching in a mobile communication system having a multi-cell environment, the method comprising:
   receiving the signal from a transmitting party device;
   performing a synchronization based on the received signal, wherein the signal is defined by a combination of a first code sequence derived from a first index and a second code sequence derived from a second index, wherein a combination of the first index and the second index permits identification of an identity of the cell, and wherein the first index is different from the second index; and
   finding the identity of the cell using the combination of the first index and the second index,
   wherein the finding comprises:
   obtaining a cell group identifier for identifying a cell group including at least one cell from the first index;
   obtaining a cell identifier for identifying the cell included in the cell group identified by the cell group identifier using the second index; and
   identifying the cell included within the cell group using the cell identifier, and wherein the length of the first code sequence and the length of the second code sequence are identical.

4. The method of claim 3, wherein the signal is further defined by a concatenation of the first code sequence and the second code sequence at a frequency domain.

* * * * *